United States Patent
Sommers (10) Patent No.: US 11,258,719 B1
(45) Date of Patent: Feb. 22, 2022

(54) METHODS, SYSTEMS AND COMPUTER READABLE MEDIA FOR NETWORK CONGESTION CONTROL TUNING

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/001,614

(22) Filed: Aug. 24, 2020

(51) Int. Cl.
  *H04L 12/801* (2013.01)
  *H04L 12/855* (2013.01)
  *H04L 12/26* (2006.01)
  *H04L 29/08* (2006.01)

(52) U.S. Cl.
  CPC .......... *H04L 47/2466* (2013.01); *H04L 43/04* (2013.01); *H04L 43/10* (2013.01); *H04L 67/1097* (2013.01)

(58) Field of Classification Search
  CPC ......... H04L 47/26; H04L 47/11; H04L 43/16; H04L 43/0876; H04L 47/283
  See application file for complete search history.

(56) References Cited

U.S. PATENT DOCUMENTS

| | | |
|---|---|---|
| 7,633,939 B2 | 12/2009 | Curran-Gray et al. |
| 9,300,565 B2 | 3/2016 | Robitaille et al. |
| 9,582,620 B1 | 2/2017 | Segal et al. |
| 9,614,689 B2 | 4/2017 | Cook et al. |
| 9,819,553 B2 | 11/2017 | Robitaille et al. |
| 9,971,620 B2 | 5/2018 | Karnes |
| 10,181,912 B1 | 1/2019 | Callaghan et al. |
| 10,686,671 B1 | 6/2020 | Mozumdar et al. |
| 10,868,730 B2 | 12/2020 | Mozumdar et al. |
| 11,032,151 B1 | 6/2021 | Sommers |
| 2005/0041592 A1 | 2/2005 | Hannel et al. |
| 2009/0207752 A1 | 8/2009 | Bugenhagen |

(Continued)

FOREIGN PATENT DOCUMENTS

| | | |
|---|---|---|
| CN | 101631080 A | 1/2010 |
| CN | 101854268 A | 10/2010 |
| CN | 107749802 A | 3/2018 |

OTHER PUBLICATIONS

Notice of Allowance and Fee(s) Due for U.S. Appl. No. 16/869,129 (dated Sep. 28, 2020).

(Continued)

*Primary Examiner* — Chirag R Patel (57) ABSTRACT

The subject matter described herein includes methods, systems, and computer readable media for network congestion control tuning. A method for network congestion control tuning occurs at a network congestion control tuning analyzer. The method includes receiving in-band telemetry (INT) metadata from a system under test (SUT); analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information; and performing the tuning action for adjusting the DCQCN mechanism associated with the SUT.

18 Claims, 4 Drawing Sheets

(56) References Cited

U.S. PATENT DOCUMENTS

| | | |
|---|---|---|
| 2011/0064091 A1 | 3/2011 | Darras et al. |
| 2013/0064095 A1 | 3/2013 | Chew et al. |
| 2013/0070777 A1 | 3/2013 | Hutchison et al. |
| 2015/0088827 A1 | 3/2015 | Xu et al. |
| 2015/0172208 A1 | 6/2015 | DeCusatis et al. |
| 2015/0365325 A1 | 12/2015 | Hwang et al. |
| 2017/0180238 A1 | 6/2017 | Telle |
| 2017/0214703 A1 | 7/2017 | Tekchandani |
| 2017/0364794 A1 | 12/2017 | Mahkonen et al. |
| 2018/0041399 A1 | 2/2018 | Robitaille et al. |
| 2018/0106702 A1 | 4/2018 | Fattu et al. |
| 2018/0255027 A1 | 9/2018 | Winig et al. |
| 2018/0316608 A1 | 11/2018 | Dowlatkhah et al. |
| 2019/0014395 A1 | 1/2019 | Anand et al. |
| 2019/0140893 A1 | 5/2019 | Artzi et al. |
| 2019/0222481 A1 | 7/2019 | Hira |
| 2019/0260682 A1 | 8/2019 | Ewert |
| 2019/0354406 A1 | 11/2019 | Ganguli et al. |
| 2019/0386924 A1* | 12/2019 | Srinivasan ............ H04L 47/115 |
| 2020/0067792 A1* | 2/2020 | Aktas ................ H04L 43/0829 |
| 2020/0120029 A1* | 4/2020 | Sankaran ............... H04L 45/48 |
| 2020/0267059 A1 | 8/2020 | Mozumdar et al. |
| 2020/0326971 A1* | 10/2020 | Yang ..................... H04L 69/161 |
| 2020/0366588 A1 | 11/2020 | Bergeron |
| 2020/0366608 A1* | 11/2020 | Pan ........................ H04L 47/25 |
| 2021/0112002 A1* | 4/2021 | Pan ........................ H04L 47/12 |

OTHER PUBLICATIONS

Extended European Search Report for European Application Serial No. 19202282.0 (dated Apr. 7, 2020).

Commonly-Assigned, co-pending U.S. Appl. No. 16/415,790 for "Indirect Testing Using Impairment Rules," (Unpublished, filed May 17, 2019).

"Principles of Chaos Engineering", https://principlesofchaos.org/, pp. 1-2 (May 2018).

"Network Functions Virtualization (NFV); Assurance; Report on Active Monitoring and Failure Detection," Draft ETSI GS NFV-REL004, V0.1.1, pp. 1-62 (Jul. 2015).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Beltman et al., "Collecting telemetry data using P4 and RDMA," University of Amsterdam, pp. 1-12 (2020).

Liu et al., "HPCC++: Enhanced High Precision Congestion Control," Network Working Group, pp. 1-15 (Jun. 17, 2020).

Commonly-Assigned, co-pending U.S. Appl. No. 16/869,129 for "Methods, Systems, and Computer Readable Media for Testing Network Elements of an In-Band Network Telemetry Capable Network," (Unpublished, filed May 7, 2020).

Notice of Allowance and Fee(s) Due for U.S. Appl. No. 16/181,309 (dated Mar. 19, 2020).

"Traffic Management User Guide (QFX Series and EX4600 Switches)," Juniper Networks, pp. 1-1121 (Mar. 18, 2020).

"H3C S6850 Series Data Center Switches," New H3C Technologies Co., Limite, pp. 1-13 (Mar. 2020).

Non-Final Office Action for U.S. Appl. No. 16/181,309 (dated Oct. 28, 2019).

Even et al, "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

"RoCE Congestion Control Interoperability Perception vs. Reality," Broadcom White Paper, pp. 1-8 (Jul. 23, 2019).

"What is RDMA?," Mellanox, pp. 1-3 (Apr. 7, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

Geng et al., "P4QCN: Congestion Control Using P4-Capable Device in Data Center Networks," Electronics, vol. 8, No. 280, pp. 1-17 (Mar. 2, 2019).

"Understanding DC-QCN Algorithm for RoCE Congestion Control," Mellanox, pp. 1-4 (Dec. 5, 2018).

"Data Center Quantized Congestion Notification (DCQCN)," Juniper Networks, pp. 1-7 (Oct. 4, 2018).

"Understanding RoCEv2 Congestion Management," Mellanox, https://community.mellanox.com/s/article/understanding-rocev2-congestion-management, pp. 1-6 (Dec. 3, 2018).

Commonly-Assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).

Anand et al., "POINT: An Intent-driven Framework for Integrated Packet-Optical In-band Network Telemetry," Infinera Corporation, pp. 1-6 (2018).

Liang et al., "In-band Network Function Telemetry," Tsinghua University, pp. 1-3 (Aug. 20-25, 2018).

Mittal et al., "Revisiting Network Support for RDMA," SIGCOMM '18, pp. 1-14 (Aug. 20-25, 2018).

Hyun et al., "Knowledge-Defined Networking using In-band Network Telemetry," Department of Computer Science and Engineering, POSTECH, pp. 1-4 (2017).

Varadhan et al., "Validating ROCEV2 in the Cloud Datacenter," OpenFabrics Alliance, 13th Annual Workshop 2017, pp. 1-17 (Mar. 31, 2017).

Van, Tu Nguyen et al., "Towards ONOS-based SDN Monitoring using In-band Network Telemetry," Department of Computer Science and Engineering, POSTECH, pp. 1-6 (2017).

Zhu et al., "ECN or Delay: Lessons Learnt from Analysis of DCQCN and TIMELY," CoNEXT '16, pp. 1-15 (Dec. 12-15, 2016).

Kim et al., "In-band Network Telemetry (INT)," pp. 1-28 (Jun. 2016).

Kim et al., "In-band Network Telemetry via Programmable Dataplanes," pp. 1-2 (2015).

Zhu et al., "Congestion Control for Large-Scale RDMA Deployments," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

Mittal et al., "TIMELY: RTT-based Congestion Control for the Datacenter," SIGCOMM '15, pp. 1-14 (Aug. 17-21, 2015).

"RoCE in the Data Center," Mellanox Technologies, White Paper, pp. 1-3 (Oct. 2014).

Barak, "Introduction to Remote Direct Memory Access (RDMA)," http://www.rdmamojo.com/2014/03/31/remote-direct-memory-access-rdma/, pp. 1-14 (Mar. 31, 2014).

"Quick Concepts Part 1—Introduction to RDMA," ZCopy, Education and Sample Code for RDMA Programming, pp. 1-5 (Oct. 8, 2010).

Alizadeh et al., "Data Center TCP (DCTCP)," SIGCOMM '10, pp. 1-12 (Aug. 30-Sep. 3, 2010).

Grochla, "Simulation comparison of active queue management algorithms in TCP/IP networks," Telecommunication Systems, pp. 1-9 (Oct. 2008).

Non-Final Office Action for U.S. Appl. No. 16/415,790 (dated Jun. 18, 2021).

Commonly-Assigned, co-pending U.S. Appl. No. 17/319,872 for "Methods, Systems and Computer Readable Media for Stateless Service Traffic Generation," (Unpublished, filed May 13, 2021).

First Office Action for Chinese Patent Application No. 201810373217.5 (dated Feb. 2, 2021).

Combined Search and Examination Report under Sections 17 & 18(3) for Great Britain Application Serial No. GB2009118.7 (dated Mar. 8, 2021).

* cited by examiner

METHODS, SYSTEMS AND COMPUTER READABLE MEDIA FOR NETWORK CONGESTION CONTROL TUNING

TECHNICAL FIELD

The subject matter described herein relates to network testing. More particularly, the subject matter described herein relates to methods, systems, and computer readable media for network congestion control tuning.

BACKGROUND

Network operators typically test network nodes for reliability and other characteristics before deploying the network nodes to production environments (e.g., non-test environments). Generally, it is important to test networks nodes with various amounts of traffic and different types of traffic. For example, a test platform, such as an IxNetwork™ platform manufactured by Keysight, may be usable for network topology testing and traffic analysis and may generate test traffic for testing various network nodes using one or more protocols.

Data centers may be a term for distributed systems (e.g., multiple servers, switches, and/or other devices in same building) used for performing various functions. Within a data center, some nodes may perform centralized functions (e.g., services or microservices, like authentication or data access) involved with handling user traffic or providing services to users. Generally, east-west traffic may refer to intra-data center traffic (e.g., traffic within the data center or nodes thereof) and north-south traffic may refer to traffic that traverses the data center from or to a system physically residing outside the data center, e.g., traffic to or from a user.

Issues can arise when testing and/or configuring a data center or a distributed system. For example, a network operator may use one or more network congestion control mechanisms to mitigate network congestion. However, it may require significant time and testing resources to determine appropriate settings for effective network congestion control for various real-world scenarios.

SUMMARY

The subject matter described herein includes methods, systems, and computer readable media for network congestion control tuning. A method for network congestion control tuning occurs at a network congestion control tuning analyzer. The method includes receiving in-band telemetry (INT) metadata from a system under test (SUT); analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information; and performing the tuning action for adjusting the DCQCN mechanism associated with the SUT.

A system for network congestion control tuning includes a network congestion control tuning analyzer (NCCTA) implemented using at least one processor. The NCCTA is configured for: receiving INT metadata from a SUT; analyzing network information associated with one or more RDMA transactions for determining a tuning action for adjusting a DCQCN mechanism associated with the SUT, wherein the network information includes the INT metadata and DCQCN information; and performing the tuning action for adjusting the DCQCN mechanism associated with the SUT.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Remote direct memory access (RDMA) is concept usable by a remote machine to access memory of another machine without involving the machines' operating systems. By avoiding the operating systems, RDMA transactions can be significantly more efficient than alternate methods for requesting and receiving such data. One example RDMA implementation may utilize a RDMA over converged Ethernet (RoCE) protocol which allows RDMA transactions across an Ethernet network as long as the endpoints are RDMA capable. For example, using an RoCE protocol, an RDMA capable NIC (RNIC) or related device may send RDMA traffic to another RNIC or related device via standard Ethernet infrastructure. Further, the RoCE protocol can be deployed within a data center environment for improving performance of applications and microservices hosted within the data center environment.

While performing RDMA transactions across an Ethernet network can yield efficient data exchange and network throughput, various issues can arise when a network is congested because of dynamic, heavy workloads. Further, issues can be exacerbated if one or more network congestion control mechanisms are utilized but not properly configured or tuned. For example, a data center related Ethernet network may utilize a data center quantized congestion notification (DCQCN) mechanism for network congestion control. The DCQCN mechanism may utilize aspects of priority-based flow control (PFC) and explicit congestion notification (ECN). In this example, the DCQCN mechanism can use ECN aspects to mark packets such that the marked packets trigger an ECN enabled source (e.g., a packet sender) to reduce its transmission rate. The DCQCN mechanism can also use PFC aspects to provide link-level flow control by triggering a PFC enabled switch to transmit a pause frame to a packet sender for pausing or stopping a packet flow for a period of time. While a DCQCN mechanism can be useful in mitigating network congestion when properly configured, issues arise when flows are stopped prematurely, e.g., before reducing transmission rates using ECN messages. Additional information regarding DCQCN is found in "Congestion Control for Large-Scale RDMA Deployments" by Zhu et al. (October 2015); the disclosure of which is incorporated herein by reference in its entirety.

In accordance with some aspects of the subject matter described herein, techniques, systems, methods, or mechanisms for network congestion control tuning are provided. For example, a congestion analyzer system in accordance with aspects described herein may be configured to determine and/or perform tuning actions associated with a data center environment by obtaining in-band telemetry (INT) metadata from nodes with the data center environment and DCQCN information. In this example, congestion analyzer system may correlate the INT metadata and the DCQCN information, e.g., based on precise, synchronized timestamps and then using the information to generate a network congestion report containing tuning actions or recommendations for mitigating network congestion or related issues.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
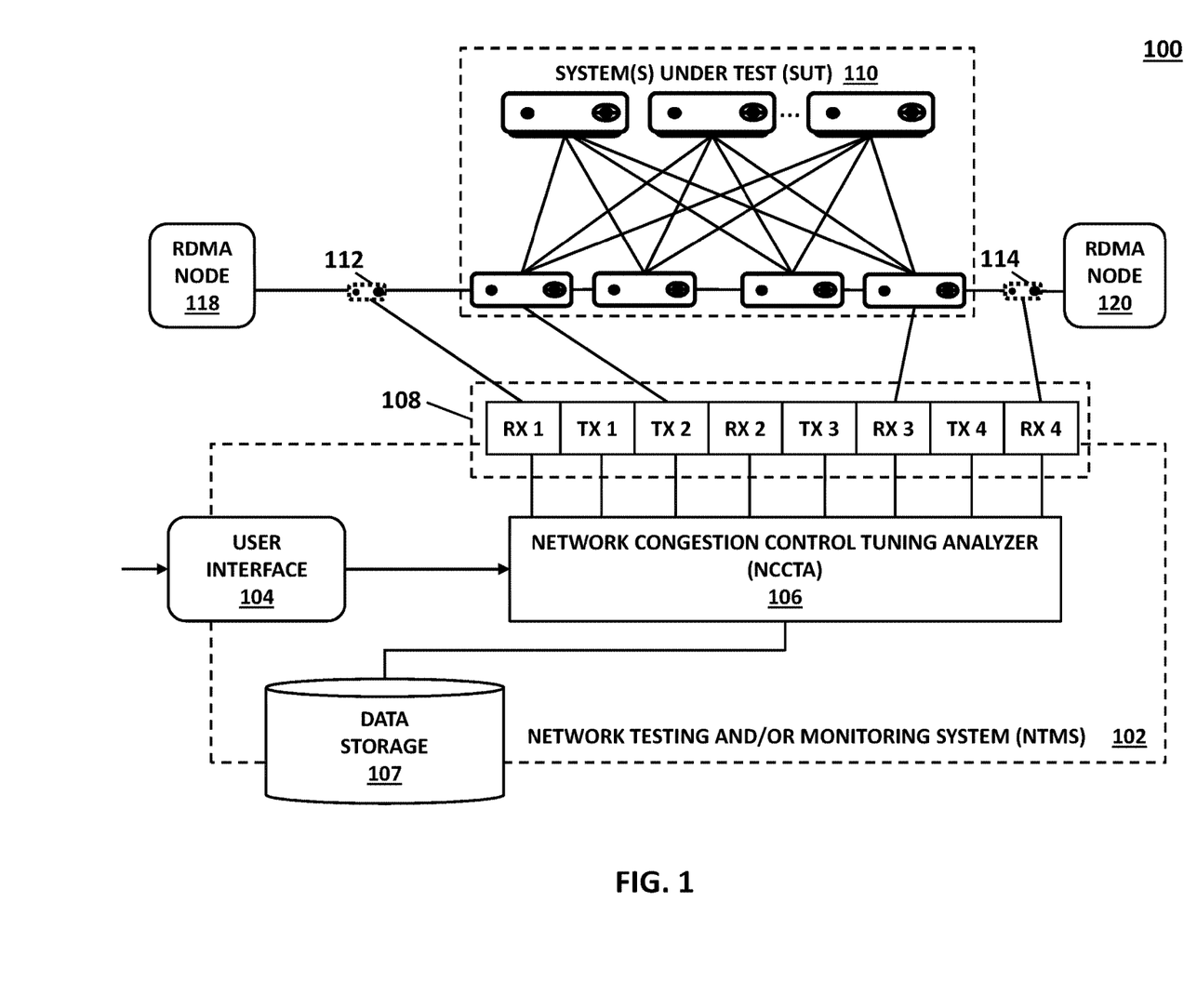
FIG. 1 is a block diagram illustrating an example environment for analyzing network congestion control.

FIG. 1 is a diagram illustrating an example environment 100 for analyzing network congestion control. Referring to FIG. 1, environment 100 may include a network testing and/or monitoring system (NTMS) 102 for performing various monitoring and/or testing operations. For example, NTMS 102 may represent any suitable entity or entities (e.g., one or more testing platforms, nodes, or devices) associated with monitoring and/or testing one or more system(s) under testing (SUT) 110. In some embodiments, NTMS 102 may include network monitoring and/or related analysis functionality. In some examples, NTMS 102 may include or interact with a number of active or passive network monitoring devices (NDMs) associated with SUT 110. In some examples, NTMS 102 may include or interact with NMDs 112-114 that are configured to modify non-test traffic to include in-band telemetry (INT) header information for triggering INT metadata collection at SUT 110 or nodes therein. In some examples, NTMS 102 or a related entity may analyze network information (e.g., observed INT metadata and network congestion control information) and may then determine and/or perform actions for network congestion control tuning or related analysis. Additional details regarding INT is found in "In-band Network Telemetry (INT)" by Kim et al. (June 2016); the disclosure of which is incorporated herein by reference in its entirety. Further information regarding INT is found in a paper titled "In-band Network Telemetry (INT) Dataplane Specification Version 2.1." The paper is attached as Appendix A and is hereby incorporated by reference in its entirety.

In some embodiments, NTMS 102 may include traffic generation and/or related testing functionality. For example, NTMS 102 or a related entity may generate and send test RDMA traffic to SUT 110 or related nodes. In this example, NTMS 102 may receive the test traffic or related traffic from SUT 110 and analyze one or more performance aspects associated with SUT 110.

In some embodiments, NTMS 102 may be a stand-alone tool, an in-line device, a testing device, a testing platform, a network tap, or software executing on at least one processor. In some embodiments, NTMS 102 may be a single node or may be distributed across multiple computing platforms or nodes.

In some embodiments, NTMS 102 may include one or more modules for performing various functions or operations. For example, NTMS 102 may include a network node emulation module for emulating a node or device that communicates with SUT 110.

NTMS 102 may include a user interface 104, a network congestion control tuning analyzer (NCCTA) 106, one or more ports 108, and/or data storage 107. In some embodiments, NTMS 102 may provide user interface 104 for communicating with an analysis operator and/or another entity. For example, an analysis operator may be any entity (e.g., an automated system or a device or system controlled or controllable by a human user) for selecting and/or configuring various aspects associated with configuring and/or executing one or more tests or for analyzing observed network information. For example, user interface 104 (e.g., an application user programming interface (API) and a graphical user interface (GUI)) may be provided for providing configuration information, such as a network traffic latency emulation metrics, traffic patterns, service emulation settings, etc. In some embodiments, user interface 104 may support automation (e.g., via one or more scripting languages), a representational state transfer (REST) or other API, a command line, and/or a web-based GUI.

NCCTA 106 may be any suitable entity or entities (e.g., software executing on a processor, an application-specific integrated circuit (ASIC), a field programmable gate array (FPGA), or a combination of software, an ASIC, or an FPGA) for performing one or more aspects associated with analyzing network information related to SUT 110 and/or for determining tuning actions for adjusting one or more network congestion control mechanisms associated with SUT 110. For example, NCCTA 106 may be configured for receiving INT metadata and other network information from SUT 110; analyzing network information associated with one or more RDMA transactions for determining a tuning action for adjusting a network congestion control mechanism associated with the SUT; and performing the tuning action for adjusting the network congestion control mechanism associated with the SUT.

In some embodiments, a tuning action may involve determining one or more recommendations for adjusting or tuning one or more congestion control parameters to mitigate network congestion and/or to make a related congestion control mechanism (e.g., DCQCN) more effective. Example congestion control parameters for improving a DCQCN based environment may include a headroom buffer parameter, a PFC threshold parameter, and/or an ECN threshold parameter. In some examples, a headroom buffer parameter may be a value indicating an amount of messages or packets a particular ingress buffer or queue can hold (e.g., so that in-flight packets can be received and processed before an upstream device pauses sending packets in response to a received PFC based pause message). In some examples, a PFC threshold parameter may be a value indicating an amount of messages or packets a particular ingress buffer or queue can hold for a given group (e.g., an ingress port and/or priority group) before a PFC based pause message is sent to an upstream device. In some examples, an ECN threshold parameter may be a value indicating an amount of messages or packets a particular egress buffer or queue of a network switch can hold before the network switch starts ECN marking packets in that queue.

In some embodiments, NCCTA 106 may utilize one or more analyzer algorithms for detecting appropriate parameter values. For example, NCCTA 106 may attempt to identify an ECN threshold value that is appropriately lower than an ingress PFC threshold value so as to ensure PFC throttling is not triggered before a network switch has a chance to mark packets with ECN and before ECN related transmission rate throttling has a chance to mitigate network congestion.

In some embodiments, an analyzer algorithm may correlate network information from various sources using synchronized, precise timestamps and determining, using INT metadata, whether congestion control parameters need adjustment. For example, NCCTA 106 may use correlated network information to identify an average or highest one-way network latency for ECN marked packets during congestion and average or highest amount of ingress and/or egress packets sent to a particular buffer in this amount of time. In this example, the analyzer algorithm may use these computed metrics to approximate a realistic number of in-flight packets that may be transmitted to various buffers or queues and then use that knowledge to generate one or more headroom buffer parameter values. Continuing with this example and assuming a buffer or queue size is fixed, the analyzer algorithm may work backwards using the headroom buffer parameter values to identify appropriate ECN threshold parameter values and PFC threshold parameter values.

In some embodiments, NCCTA 106 or another entity may utilize one or more analyzer algorithms for detecting device and/or protocol issues and may also generate a report regarding detected issues or otherwise notify a network operator or a network management system about the issues. For example, NCCTA 106 or another entity may use one or more techniques (e.g., heuristics based in part on a protocol standard, like RoCE version 2) that utilizes collected INT metadata (e.g., precise timestamps) to detect whether a device in SUT 110 (e.g., a network switch) is behaving as expected.

In some embodiments, NCCTA 106 or another entity may detect whether an RDMA node or a node associated with SUT 110 is acting according to one or more congestion control parameter values or related timers and may report any detected issues. For example, when analyzing an observed packet containing an ECN field indicating congestion, NCCTA 106 or another entity may determine whether embedded INT data indicating queue occupancy is consistent with device settings (e.g., that the queue occupancy indicates that an ECN threshold value was exceeded). In this example, if NCCTA 106 or another entity determines that the packet was ECN field marked prematurely (e.g., before the ECN threshold value was exceeded), then the issue may be reported.

In some embodiments, NCCTA 106 or another entity may determine whether an observed congestion related packet (e.g., a congestion notification packet (CNP)) is expected, e.g., based on a relevant protocol standard or a vendor's implementation, and may report any detected issues. For example, a receiving end station (RP) (e.g., RDMA node 120) may be expected to send at most one CNP every 50 microseconds to a sending end station (SP) (e.g., RDMA node 118) in response to receiving one or more ECN field marked packets associated with a queue pair (QP) during a particular time period. In this example, NCCTA 106 or another entity may analyze observed CNPs that are closely-spaced (e.g., based on INT related timestamps) and determine if these CNPs were sent or generated as expected, e.g., if they were following a known or expected timeout or limit threshold value. Continuing with this example, if NCCTA 106 or another entity determines that the observed CNPs were sent unexpectedly, then the issue may be reported.

In some embodiments, NCCTA 106 or another entity may determine whether an observed congestion related packet contains appropriate data. For example, NCCTA 106 or another entity may verify whether an ECN field value (e.g., bits '01') of an observed ECN field marked packet is set correctly. In another example, NCCTA 106 or another entity may determine whether parameter values of an observed CNP are set to appropriate values based on information in an observed ECN field marked packet which triggered the CNP. Continuing with this example, if NCCTA 106 or another entity determines that the CNP contained inappropriate parameter values, then the issue may be reported.

In some embodiments, NCCTA 106 or a related entity (e.g., a test generator) may generate test sessions, test cases, or related test traffic for simulating RDMA transactions or other realistic scenarios. For example, NCCTA 106 may receive user input via user interface 104 to obtain user intent or other information about a test scenario, e.g., a scenario to analyze or test network congestion control. In this example, NCCTA 106 may use the user input and predefined test case templates, analysis templates, or related data to generate one or more test cases and/or test sessions.

In some embodiments, NCCTA 106 or a related entity may generate one or more test case templates or related test flows based on observed or captured traffic patterns. For example, traffic flows (e.g., RDMA transactions) that traverse SUT 110 (e.g., a data center environment or a converged Ethernet network) may be monitored and captured (e.g., entire packets and/or flows may be captured, packet and/or flow metadata may be capture, etc.) and used, at least in part, to construct simulated background traffic and/or simulated RDMA transactions that can be used to test SUT 110.

NCCTA 106 or a related entity (e.g., a test manager) may perform one or more aspects associated with test session configuration and related management. For example, NCCTA 106 may receive or generate configuration instructions associated with analyzing and/or testing SUT 110 and may provision or provide the configuration instructions to various entities, e.g., ports 108. In this example, the configuration instructions may be communicated to various test system components via an internal physical or virtual bus.

In some embodiments, NTMS 102 or a related entity (e.g., NCCTA 106) may utilize an API (e.g., a REST API), communications protocol, or another mechanism (e.g., a pluggable closed-loop algorithm interface) for communicating with SUT 110 and/or for effecting network congestion control parameter adjustments. For example, using an API a related protocol, or other mechanism, NTMS 102 or NCCTA 106 may trigger or perform one or more tuning recommendations.

In some embodiments, NCCTA 106 or a related entity (e.g., a configuration manager) may instruct or trigger one or more nodes (e.g., network switches in SUT 110) to send INT related data or related reports (e.g., an INT postcard or intermediate telemetry report) to NCCTA 106 or another entity. For example, NCCTA 106 may generate and send or facilitate sending per-node configuration instructions to one or more switches in SUT 110 for instructing the switches to provide intermediate INT reports to NCCTA 106 or another entity. In this example, NCCTA 106 may configure INT capable switches via a network operating system and/or a supported API. In some embodiments, intermediate INT reports may provide visibility into intermediate states in a packet's lifecycle and allow for potentially the detection of dropped packets because intermediate packets which do not appear at the final stage are considered dropped (or misrouted).

In some embodiments, NCCTA 106 or a related entity (e.g., a configuration manager) may instruct or trigger one or more nodes (e.g., network switches in SUT 110) to send copied or mirrored packets or portions thereof to NCCTA 106 or another entity. For example, NCCTA 106 may send or facilitate sending per-node configuration instructions to one or more switches in SUT 110 for instructing the switches to copy certain packets or portions thereof and to send this copied information to NCCTA 106 or another entity. In this example, NCCTA 106 may configure such switches via a network operating system and/or a supported API.

In some embodiments, NTMS 102 or NCCTA 106 may trigger or perform one or more tuning recommendations as part of an iterative process for network congestion control tuning. For example, NTMS 102 or NCCTA 106 may implement a closed-loop or partially closed-loop system that involves iteratively optimizing network congestion control parameters using one or more tuning cycles, where each tuning cycle includes analyzing real and/or test traffic and related network metrics associated with SUT 110, determining at least one tuning recommendation based on the analysis, and triggering or performing the at least one tuning recommendation for SUT 110. In this example, NTMS 102 or NCCTA 106 may be configured to perform tuning cycles for a predetermined number of times or until a threshold value is reached, e.g., until a particular network congestion metric no longer indicates improvement by a predetermined percentage.

In some embodiments (e.g., where test traffic is used for tuning network congestion control parameters), NTMS 102 or NCCTA 106 may use previously observed or stored traffic to generate reproducible workload patterns and/or synthetic traffic for testing various traffic pattern scenarios. In such embodiments, NTMS 102 or NCCTA 106 may use synthetic traffic along with one or more iterative optimization processes to identify appropriate network congestion control parameter values or related settings for multiple traffic pattern scenarios, which may be useful to a network operator or a related network management system. For example, after repeatedly testing SUT 110 using various traffic patterns and different parameter values, tuning recommendations or related information from such testing may allow a network to dynamically change or adjust network congestion control parameter values depending on observed traffic patterns.

Ports 108 may include or utilize any suitable entity or entities (e.g., one or more network interface cards (NICs), physical processors, and/or other hardware) for sending or receiving communications. For example, NTMS 102 or NCCTA 106 may use one or more multiple ports 108 (e.g., communications interfaces) for receiving and sending test packets, configuration instructions, observed traffic or related metrics, or other data.

In some embodiments, Ports 108 may send or receive IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 108 may include various hardware and/or software that is configurable for processing, generating, sending, and/or receiving test traffic or related information. For example, ports 108 or components therein may be configured or provisioned by NCCTA 106 to obtain network information, e.g., INT metadata and DCQCN information, from test packets and/or NMDs 112-114.

In some embodiments, ports 108 may include multiple port modules for interacting with SUT 110. In some examples, a port module may include one or more transmit ports for sending test packets to SUT 110 or a node thereof and one or more receive ports for receiving test packets back from SUT 110 or a node thereof. In some examples, a port module may include one or more transmit ports for sending information to one or more NMDs and one or more receive ports for information from one or more NMDs. In some examples, each port module or port(s) thereof may be assigned to a particular application, service, test flow, and/or IP address and port or for handling communications associated with a particular function or role.

NTMS 102 and/or NCCTA 106 may include functionality for accessing data storage 107. Data storage 107 may be any suitable entity or entities (e.g., a storage device, a non-transitory computer readable medium, or a storage system) for maintaining or storing information related to testing and/or related metrics. For example, data storage 107 may contain simulated test traffic, test cases, test session data, topology information for SUT 110, configuration settings, historical congestion data, network congestion control tuning logic, potential tuning actions, performance metrics (e.g., statistics), and/or other information usable for generating network congestion control tuning actions, e.g., one or more recommendations for tuning congestion control settings associated with SUT 110. In some embodiments, data storage 107 may be located at NTMS 102, NCCTA 106, another node, or distributed across multiple platforms or devices.

SUT 110 may be any suitable entity or entities (e.g., devices, systems, or platforms) for communicating with NTMS 102 and/or receiving, processing, forwarding, and/or sending test traffic, non-test traffic, or other data. For example, SUT 110 may include a network router, a network switch, a network device, a server, or a network controller. In another example, SUT 110 may include one or more systems and/or computing platforms, e.g., a data center or a group of servers and/or switches connected via a network. In yet another example, SUT 110 may include one or more networks or related components, e.g., a converged Ethernet network, an access network, a core network, or the Internet.

In some embodiments, SUT 110 may represent a converged Ethernet environment (e.g., a data center environment) that includes multiple transit nodes (e.g., network switches) that are INT capable and can provide internal metric and network congestion related information. For example, nodes in SUT 110 may be configured for detecting INT instructions in packet headers and may insert into the packets INT metadata corresponding the INT instructions. Example INT metadata may include a switch or node identifier (ID), ingress information (e.g., an ingress port ID, an ingress timestamp, etc.), egress information (e.g., an egress port ID, an egress timestamp, a hop latency, an egress port transmit link utilization value, etc.), buffer information (e.g., queue occupancy, queue congestion status, etc.), and/ or other device related information. RDMA nodes 118-120 may be any suitable entity or entities (e.g., software executing on a processor, an ASIC, an FPGA, or a combination of software, an ASIC, or an FPGA) for communicating using RoCE and/or sending or receiving RDMA packets. For example, RDMA nodes 118-120 may each include a physical RNIC capable of initiating or accepting an RDMA transaction. In this example, RDMA nodes 118-120 may be capable of allowing an application direct access to the RNIC, e.g., without involvement from an operating system and/or without the need to copy data to a memory buffer, thereby reducing required overhead.

In some embodiments, RDMA nodes 118-120 may utilize an RNIC that implements a host channel adapter (HCA) for creating a channel from its RDMA engine to the application memory via a peripheral component interconnect (PCI) express bus. The HCA or the RDMA engine may implement in hardware all the logic needed to execute an RDMA protocol over the wire, including segmentation and reassembly as well as flow control and reliability. RDMA nodes 118-120 may setup data channels using a kernel driver, also referred to a command channel. After established the data channels, RDMA nodes 118-120 or RNICs therein may read and write buffers directly, e.g., without the kernel driver.

Network monitoring devices (NMDs) 112-114 may be any suitable entity or entities (e.g., software executing on a processor, an ASIC, an FPGA, or a combination of software, an ASIC, or an FPGA) for monitoring and/or modifying traffic heading through SUT 110. For example, NMDs 112-114 may be configured to sniff traffic, filter and/or classify traffic, and record metadata and precise timestamps for relevant packets. NMDs 112-114 may capture entire packets or portions therein, e.g., headers, parameters, particular AVPs, payload portions, etc.

In some embodiments, NMDs 112-114 may analyze captured data and generate or derive various performance metrics. NMDs 112-114 may store the captured data and/or related metrics as files in data storage 107 or may send such information to other entities (e.g., NTMS 102 or NCCTA 106) for various purposes.

In some embodiments, NMD 112 may be deployed in-line between RDMA node 118 (e.g., an RNIC RP, an INT source device, or related device) and SUT 110. NMD 112 may be configured to identify RDMA traffic from RDMA node 118 and append or insert INT instruction headers into various RDMA packets so that transit nodes (e.g., data center switches) in SUT 110 append or insert their INT metadata as the packets traverses them.

In some embodiments, NMD 114 may be deployed in-line between SUT 110 and RDMA node 120 (e.g., an RNIC NP, an INT sink device, or related device). NMD 114 may be configured to identify RDMA traffic destined to RDMA node 120 and extract and/or remove INT instruction headers and/or INT metadata from RDMA packets before forwarding the RDMA packets to RDMA node 120. In some embodiments, NMD 114 may generate and send a report containing the extracted INT metadata to one or more entities (e.g., NTMS 102, NCCTA 106, NMD 112, or some other INT collector or analyzer).

In some embodiments, NMD 112-114 may be configured to observe congestion control information (e.g., DCQCN information) in packets sent from or toward RDMA node 118 or RDMA node 120. In such embodiments, the observed congestion control information may be provided to one or more entities (e.g., NTMS 102, NCCTA 106, NMD 112, or some other INT collector or analyzer). For example, NTMS 102 and NCCTA 106 may correlate and analyze received congestion control information and INT metadata for generating congestion control tuning recommendations associated with SUT 110.

In some embodiments, environment 100 or a related network (e.g., SUT 110) may utilize one or more network congestion control mechanisms, e.g., a DCQCN mechanism. An example congestion scenario for a DCQCN controlled environment may be as follows:

1. RDMA node 118 generates RDMA (e.g., RoCE) traffic that is transmitted towards RDMA node 120;
2. A congested switch in SUT 110 implementing ECN as part of active queue management (AQM) indicates congestion via ECN fields in packets that traverse the switch;
3. RDMA node 120 generates congestion notification packets (CNPs) and sends the CNPs to RDMA node 118;
4. RDMA node 118 throttles packets using rate-control using a DCQCN based algorithm;
5. Fabric switches in SUT 110 implementing PFC may detect congestion based on PFC queue threshold values. If a PFC queue threshold value is reached or exceeded (e.g., because sender transmission rate control was not effective enough or too slow to be effective), a PFC-based pause message may be sent to RDMA node 118 for pausing or stopping a packet flow; and
6. RDMA node 118 pauses sending packets to avoid packet drops in fabric queues.

It will be appreciated that FIG. 1 is for illustrative purposes and that various nodes and/or modules, locations, and/or functionality described above in relation to FIG. 1 may be changed, altered, added, or removed.

Figure 2:
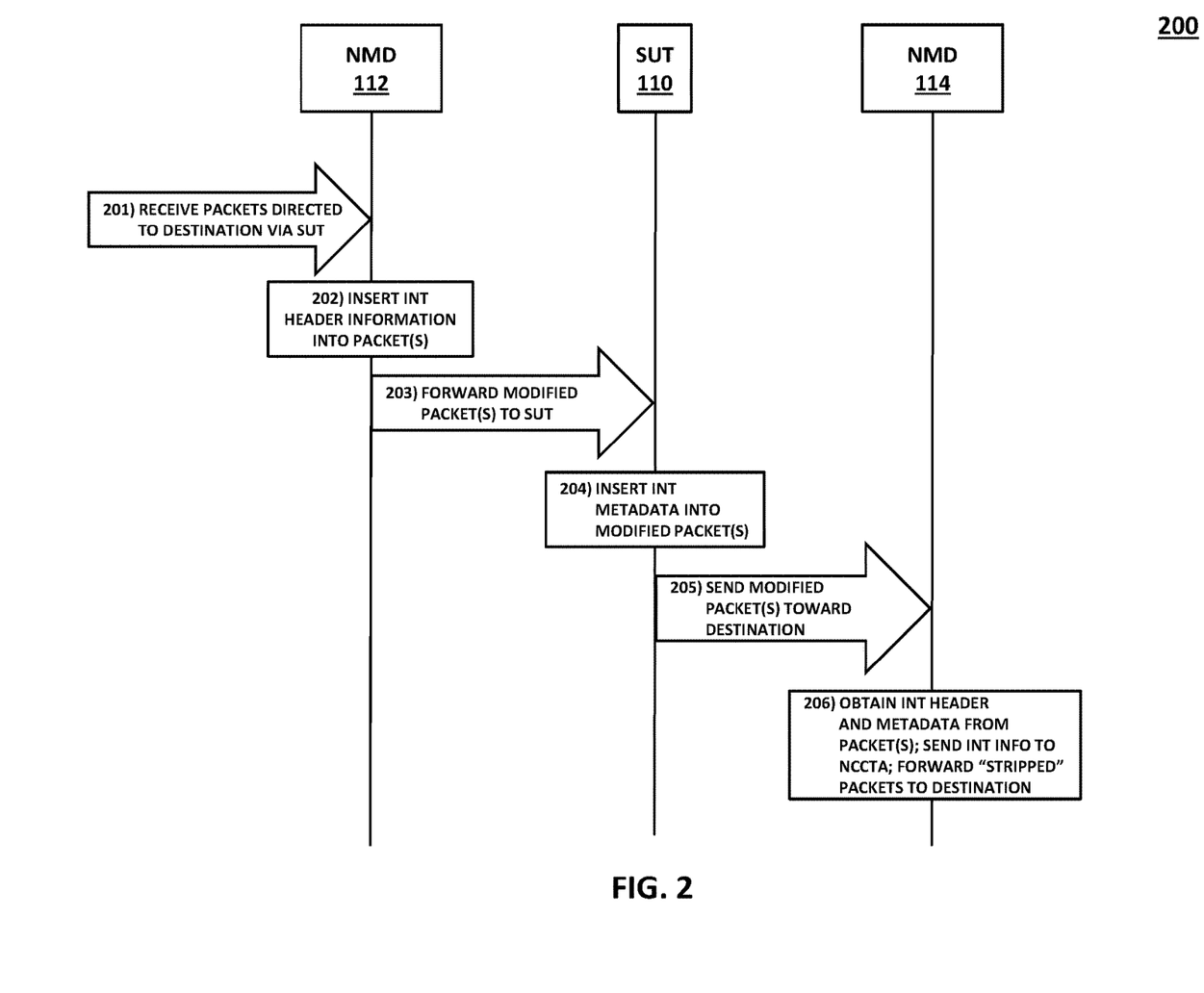
FIG. 2 is a message flow diagram illustrating an example process associated with analyzing network congestion control associated with a system under test (SUT)

FIG. 2 is a message flow diagram illustrating an example process 200 associated with analyzing network congestion control associated with SUT 110. In some embodiments, one or more devices (e.g., NMDs 112-114) may be deployed within SUT 110 and/or the surrounding testing environment. For example, multiple NDMs (e.g., active monitoring devices) can be used in environments where RDMA capable NICs or devices are separated and cannot be monitored by one NDM.

Referring to FIG. 2, NMD 112 may be deployed in-line between RDMA node 118 and SUT 110 and act as an INT source (e.g., an entity that inserts INT headers to trigger INT metadata collection), while NMD 114 may be deployed in-line between SUT 110 and RDMA node 120 and act as an INT sink (e.g., an entity that removes INT headers so as to make INT transparent to other layers or entities).

In step 201, NMD 112 may receive packets directed to a destination (e.g., RDMA node 120) via SUT 110.

In step 202, NMD 112 may insert INT header information into one or more packets for triggering SUT 110 or nodes therein (e.g., network switches) to collect and store INT metadata.

In step 203, NMD 112 may send or forward the modified packets to SUT 110 or nodes therein.

In step 204, SUT 110 or nodes therein may receive the modified packets, detect the INT header information, and, in response to the INT header information, insert INT metadata into the packets. In some embodiments, inserted INT metadata may indicate various performance metrics or related data associated with SUT 110 or nodes therein.

In step 205, SUT 110 or a node therein may send or forward the modified packets containing the INT metadata toward the destination (e.g., RDMA node 120).

In step 206, prior to the modified packets reaching their destination, NMD 114 may receive the modified packets and obtain the INT header information and INT metadata. In some embodiments, NMD 114 may send the INT metadata to NTMS 102 or NCCTA 106 for analysis or other purposes. In some embodiments, NMD 114 may strip or remove INT related information from the packets and then forward the "stripped" packets to their destination.

It will be appreciated that FIG. 2 is for illustrative purposes and that different and/or additional steps other than those depicted in FIG. 2 may occur. Further, it will be appreciated that some steps may occur in a different order than depicted in FIG. 2 and that functionality described above in relation to FIG. 2 may be changed, altered, added, or removed.

Figure 3:
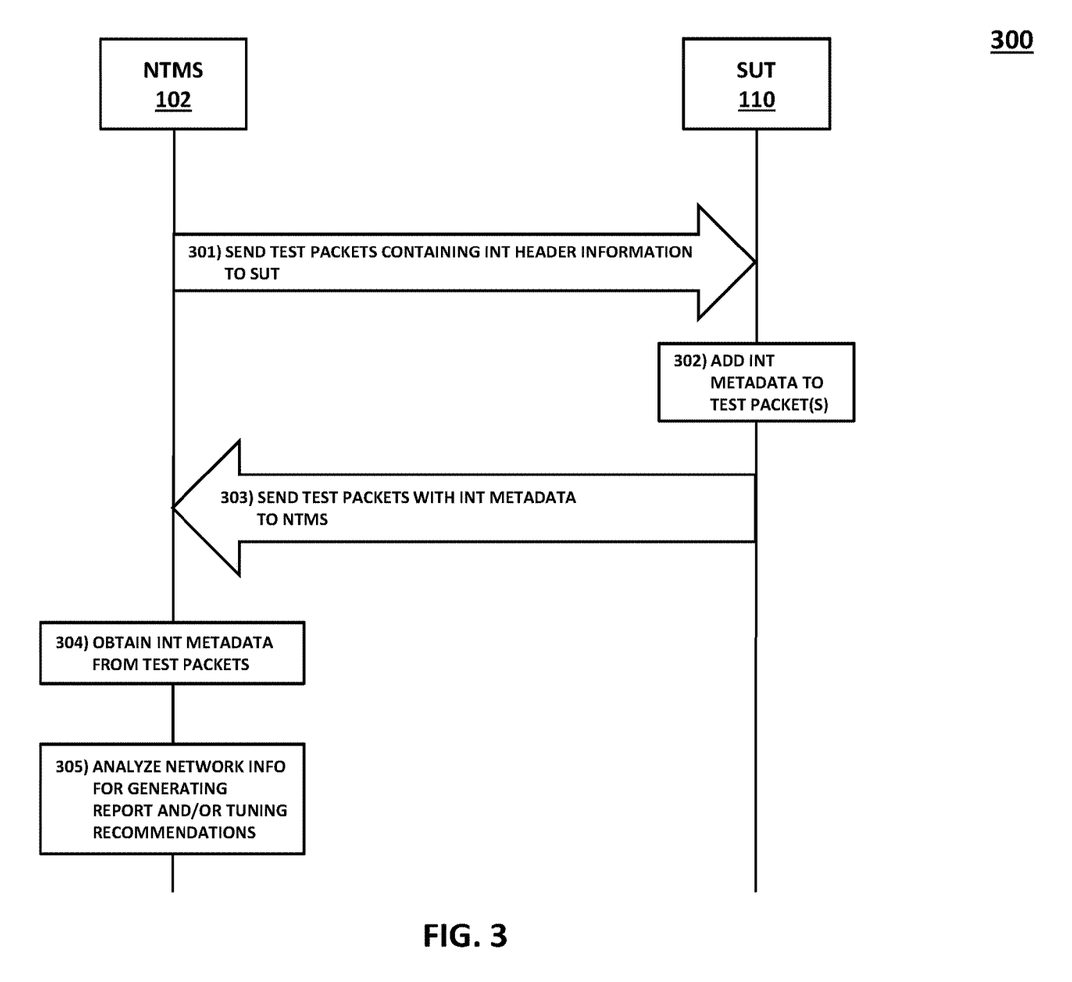
FIG. 3 is a message flow diagram illustrating an example process for testing network congestion control associated with a SUT.

FIG. 3 is a message flow diagram illustrating an example process 300 for testing network congestion control associated with SUT 110. In some embodiments, NTMS 102 may be configured for generating test packets for testing SUT 110 and/or usable for generating a tuning action associated with network congestion control. In such embodiments, NTMS 102 or a related entity (e.g., a traffic generator) may initiate RDMA transactions that include INT instruction headers so that transit nodes in SUT 110 are triggered to collect and insert, into the test packets, INT metadata that is eventually received by NTMS 102 or NCCTA 106 and analyzed. Continuing with these embodiments, NTMS 102 or a related entity (e.g., NCCTA 106) may receive the test packets containing the INT metadata and may use the INT metadata and/or other obtained network information to generate a congestion report or other tuning action associated with adjusting network congestion control. For example, NTMS 102 or a related entity (e.g., NCCTA 106) may correlate obtained INT metadata and/or other obtained network information (e.g., DCQCN information), analyze this correlated information, and generate recommendations for tuning congestion control parameters associated with SUT 110 or related RDMA capable devices.

Referring to FIG. 3, in step 301, NTMS 102 or a related entity (e.g., a traffic generator) may generate and send RDMA test packets for initiating RDMA transactions to SUT 110, where at least some of the RDMA test packets containing INT header information for triggering SUT 110 or nodes therein to insert performance metadata into those test packets.

In step 302, SUT 110 or nodes therein may receive the test packets and may insert INT metadata based in the INT header information.

In step 303, The test system would also have the ability to receive the modified RDMA test packets and extract the inserted INT metadata.

In step 304, NTMS 102 or a related entity (e.g., NCCTA 106) may receive the modified test packets and obtain the INT metadata. In some embodiments, one or more NMDs (e.g., NMDs 112-114) may collect or obtain INT metadata and/or other network information (e.g., DCQCN information or other congestion control information) and may provide or store the information in a shared memory or storage (e.g., data storage 107). In some embodiments, one or more of ports 108 may include collection and/or extraction functionality for obtaining INT metadata and/or other network information.

In step 305, NTMS 102 or a related entity (e.g., NCCTA 106) may analyze the INT metadata along with other network information to generate one or more tuning actions, e.g., a network congestion report and/or one or more recommendations for reducing congestion, e.g., by adjusting various congestion control parameters or settings. In some embodiments, a network congestion report may include an INT related telemetry report containing various INT metadata and/or related information. Additional information regarding telemetry reports is found in a paper titled "Telemetry Report Format Specification Version 2.0." The paper is attached as Appendix B and is hereby incorporated by reference in its entirety.

It will be appreciated that FIG. 3 is for illustrative purposes and that different and/or additional steps other than those depicted in FIG. 3 may occur. Further, it will be appreciated that some steps may occur in a different order than depicted in FIG. 3 and that functionality described above in relation to FIG. 3 may be changed, altered, added, or removed.

Figure 4:
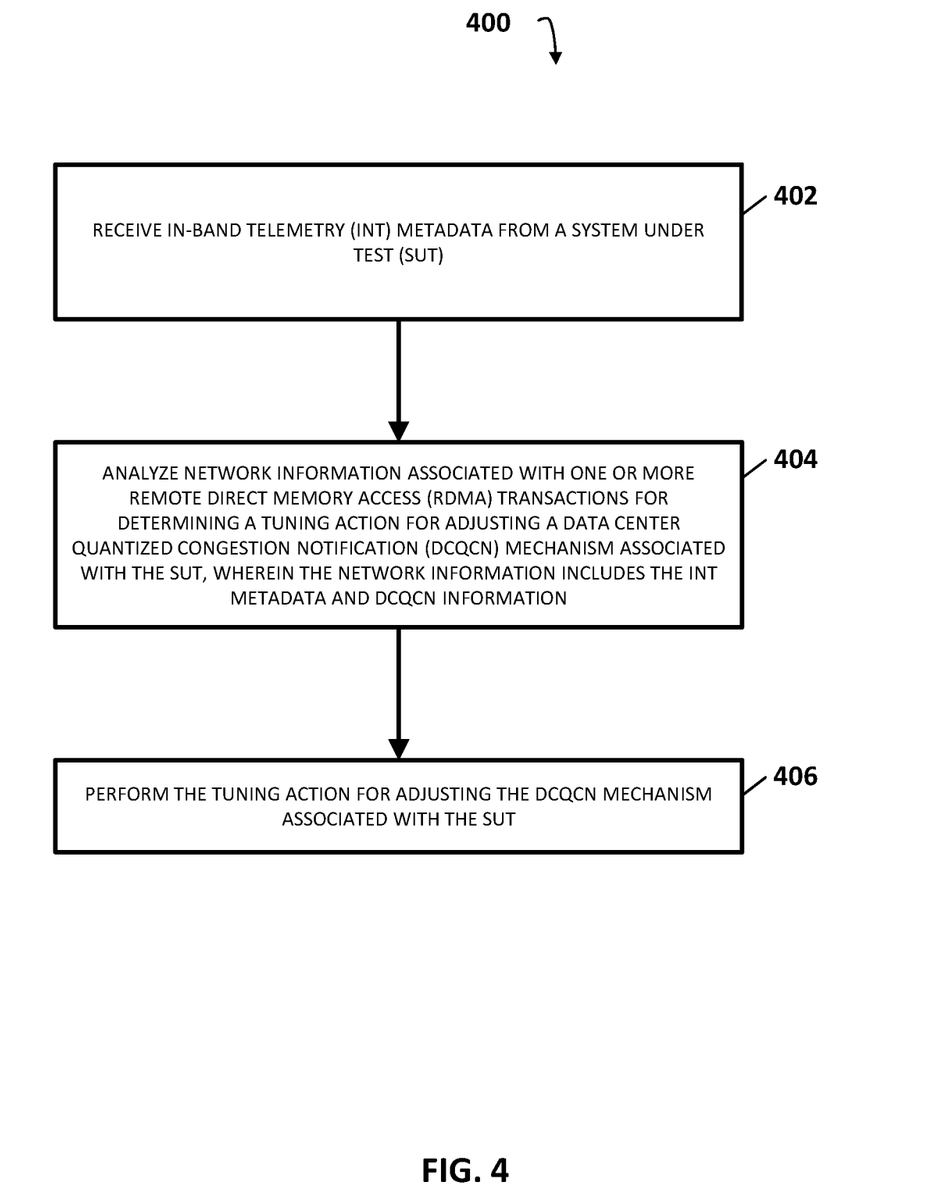
FIG. 4 is a flow chart illustrating an example process for network congestion control tuning analysis and recommendations.

FIG. 4 is a diagram illustrating an example process 400 for network congestion control tuning. In some embodiments, process 400, or portions thereof, may be performed by or at NTMS 102, NCCTA 106, and/or another node or module. In some embodiments, process 400 may include steps 402, 404, and/or 406.

Referring to process 400, in step 402, INT metadata from a SUT may be received. For example, INT metadata may be gathered or collected from a number of sources within SUT 110 (e.g., a converged Ethernet network). Example INT capable sources in SUT 110 may include network nodes, e.g., P4 programmed network switches and/or routers, application servers, web servers, or other devices. For example, one or more leaf nodes in SUT 110 may be capable of detecting INT instructions from packet headers of received packets and collecting relevant INT metadata based on those INT instructions. In this example, the INT metadata may be inserted in the packets prior to be sent or forwarded to another node or hop. In another example, nodes in SUT 110 may provide intermediate INT reports and/or copied packets or portions thereof to NCCTA 106.

In some embodiments, INT metadata from a SUT may be triggered by inserting INT instruction headers in RDMA packets or generating test RDMA packets containing INT instruction headers.

In some embodiments where INT instruction headers are inserted into live or non-test RDMA packets, the INT instruction headers may be removed by an in-line device (e.g., a RDMA sink or NMD 114) prior to the RDMA packets reaching a destination.

In step 404, network information associated with one or more RDMA transactions may be analyzed for determining a tuning action for adjusting a DCQCN mechanism associated with the SUT, wherein the network information includes the INT metadata and DCQCN information.

In some embodiments, analyzing network information may include correlating INT metadata and network congestion control information associated with one or more RDMA transactions and detecting a network congestion pattern using the INT metadata and the network congestion control information associated with a SUT, wherein the network congestion pattern indicates network conditions that cause or contribute to network congestion. In some embodiments, network congestion control information may include DCQCN information, ECN information, or PFC information.

In step 406, the tuning action for adjusting the DCQCN mechanism associated with the SUT may be performed. In some embodiments, a tuning action may include generating a performance metric associated with network congestion, reporting device or protocol issues associated with network congestion, generating a network congestion report, modifying or facilitating a modification of at least one network congestion control parameter, or performing or triggering additional testing and/or analysis using one or more tuning recommendations (e.g., monitoring subsequent traffic using different network congestion control parameter values and/or testing using one or more reproducible synthetic workloads based on the analysis of the observed network information).

In some embodiments, performing a tuning action may include using previously-stored captured traffic data and a network congestion pattern to simulate a traffic workload including RDMA payloads usable for subsequent testing.

In some embodiments, at least one network congestion control parameter may include a headroom buffer parameter, a PFC threshold parameter, or an ECN threshold parameter.

In some embodiments, a SUT may include a local area network, a wide area network, a data center related network, a converged Ethernet network, a network switch, a data server, a web server, an RoCE related node, or a data center related node.

In some embodiments, a network congestion control tuning analyzer may include a network equipment test system, a network tap, a network monitoring device, an NIC, a traffic generator, an FPGA, an ASIC, or a processor. For example, NTMS 102 or NCCTA 106 may include an RDMA-capable NIC, a traffic generator, an FPGA, an ASIC, or a processor.

It will be appreciated that process 400 is for illustrative purposes and that different and/or additional actions may be used. It will also be appreciated that various actions described herein may occur in a different order or sequence.

It should be noted that NTMS 102, NCCTA 106, and/or functionality described herein may constitute a special purpose computing device. Further, NTMS 102, NCCTA 106, and/or functionality described herein can improve the technological field of network congestion control configuration and/or related testing by providing various techniques for analyzing and/or testing congestion control in SUT 110, e.g., a data center environment. For example, NTMS 102, NCCTA 106, and/or functionality described herein can be used to analyze network information (e.g., INT metadata, DCQCN information, and/or related metrics) associated with RDMA transactions. In this example, NTMS 102, NCCTA 106, and/or functionality described herein can correlate and analyze the network information associated with the RDMA transactions to determine and/or adjust at least one network congestion control parameter associated with SUT 110, e.g., a headroom buffer parameter, a PFC threshold parameter, and/or an ECN threshold parameter.

While various examples discussed above relate to data center environments that can employ an RoCE architecture, it will be appreciated that various embodiments of the subject matter described herein may provide similar network congestion performance testing and/or network congestion control parameter tuning functionality for other environments including, for example, other RDMA architectures and associated protocols, e.g., Infiniband RNIC, iWARP RNIC, Fibre Channel RNIC, etc.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network congestion control tuning, the method comprising:
   at a network congestion control tuning analyzer:
      receiving in-band telemetry (INT) metadata from a system under test (SUT);
      analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information, wherein determining the tuning action includes determining one or more tuning recommendations for adjusting or tuning at least one network congestion control parameter; and
      performing the tuning action for adjusting the DCQCN mechanism associated with the SUT, wherein performing the tuning action includes adjusting or facilitating an adjustment of the at least one network congestion control parameter in accordance with the one or more tuning recommendations, wherein the at least one network congestion control parameter includes a headroom buffer parameter, a priority-based flow control (PFC) threshold parameter, or an explicit congestion notification (ECN) threshold parameter.

2. The method of claim 1 wherein analyzing the network information includes:
   correlating the INT metadata and network congestion control information associated with the one or more RDMA transactions; and
   detecting a network congestion pattern using the INT metadata and the network congestion control information associated with the SUT, wherein the network congestion pattern indicates network conditions that cause or contribute to network congestion.

3. The method of claim 2 wherein performing the tuning action includes using previously-stored captured traffic data and the network congestion pattern to simulate a traffic workload including RDMA payloads usable for subsequent testing.

4. The method of claim 1 wherein the INT metadata from the SUT is triggered by:
   inserting INT instruction headers in RDMA packets; or
   generating test RDMA packets containing INT instruction headers.

5. The method of claim 4 wherein the INT instruction headers are removed by an in-line device prior to the RDMA packets reaching a destination.

6. The method of claim 2 wherein the network congestion control information associated with the SUT includes ECN information or PFC information.

7. The method of claim 1 wherein the tuning action includes generating a performance metric associated with network congestion, reporting device or protocol issues associated with network congestion, generating a network congestion report, or triggering additional testing and/or analysis using one or the more tuning recommendations.

8. The method of claim 1 wherein the SUT includes a local area network, a wide area network, a data center related network, a converged Ethernet network, a network switch, a data server, a web server, an RDMA over converged Ethernet (RoCE) related node, or a data center related node and wherein the network congestion control tuning analyzer includes a network equipment test system, a network tap, a network monitoring device, a network interface card (NIC), a traffic generator, a field programmable gate array (FPGA), an application-specific integrated circuit (ASIC), or a processor.

9. A system for network congestion control tuning, the system comprising:
at least one processor; and
a network congestion control tuning analyzer implemented using the at least one processor, the network congestion control tuning analyzer configured for:
receiving in-band telemetry (INT) metadata from a system under test (SUT);
analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information, wherein determining the tuning action includes determining one or more tuning recommendations for adjusting or tuning at least one network congestion control parameter; and
performing the tuning action for adjusting the DCQCN mechanism associated with the SUT, wherein performing the tuning action includes adjusting or facilitating an adjustment of the at least one network congestion control parameter in accordance with the one or more tuning recommendations, wherein the at least one network congestion control parameter includes a headroom buffer parameter, a priority-based flow control (PFC) threshold parameter, or an explicit congestion notification (ECN) threshold parameter.

10. The system of claim 9 wherein the network congestion control tuning analyzer is configured for:
correlating the INT metadata and network congestion control information associated with the one or more RDMA transactions; and
detecting a network congestion pattern using the INT metadata and the network congestion control information associated with the SUT, wherein the network congestion pattern indicates network conditions that cause or contribute to network congestion.

11. The system of claim 10 wherein the network congestion control tuning analyzer is configured for using previously-stored captured traffic data and the network congestion pattern to simulate a traffic workload including RDMA payloads usable for subsequent testing.

12. The system of claim 9 wherein the INT metadata from the SUT is triggered by the network congestion control tuning analyzer or a related node inserting INT instruction headers in RDMA packets or generating test RDMA packets containing INT instruction headers.

13. The system of claim 12 wherein an in-line device removes the INT instruction headers prior to the RDMA packets reaching a destination.

14. The system of claim 10 wherein the network congestion control information associated with the SUT includes ECN information or PFC information.

15. The system of claim 9 wherein the tuning action includes generating a performance metric associated with network congestion, reporting device or protocol issues associated with network congestion, generating a network congestion report, or triggering additional testing and/or analysis using the one or more tuning recommendations.

16. The system of claim 9 wherein the SUT includes a local area network, a wide area network, a data center related network, a converged Ethernet network, a network switch, a data server, a web server, an RDMA over converged Ethernet (RoCE) related node, or a data center related node and wherein the network congestion control tuning analyzer includes a network equipment test system, a network tap, a network monitoring device, a network interface card (NIC), a traffic generator, a field programmable gate array (FPGA), an application-specific integrated circuit (ASIC), or a processor.

17. A non-transitory computer readable medium having stored thereon executable instructions that when executed by at least one processor of at least one computer cause the at least one computer to perform steps comprising:
at a network congestion control tuning analyzer:
receiving in-band telemetry (INT) metadata from a system under test (SUT);
analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information, wherein determining the tuning action includes determining one or more tuning recommendations for adjusting or tuning at least one network congestion control parameter; and
performing the tuning action for adjusting the DCQCN mechanism associated with the SUT, wherein performing the tuning action includes adjusting or facilitating an adjustment of the at least one network congestion control parameter in accordance with the one or more tuning recommendations, wherein the at least one network congestion control parameter includes a headroom buffer parameter, a priority-based flow control (PFC) threshold parameter, or an explicit congestion notification (ECN) threshold parameter.

18. The non-transitory computer readable medium of claim 17 wherein analyzing the network information includes:
correlating the INT metadata and network congestion control information associated with the one or more RDMA transactions; and
detecting a network congestion pattern using the INT metadata and the network congestion control information associated with the SUT, wherein the network congestion pattern indicates network conditions that cause or contribute to network congestion.

* * * * *

UNITED STATES PATENT AND TRADEMARK OFFICE
CERTIFICATE OF CORRECTION

PATENT NO. : 11,258,719 B1
APPLICATION NO. : 17/001614
DATED : February 22, 2022
INVENTOR(S) : Christian Paul Sommers Page 1 of 1

It is certified that error appears in the above-identified patent and that said Letters Patent is hereby corrected as shown below:

On the Title Page

Item (57) In the Abstract:
Should read:
"The subject matter described herein includes methods, systems, and computer readable media for network congestion control tuning. A method for network congestion control tuning occurs at a network congestion control tuning analyzer. The method includes receiving in-band network telemetry (INT) metadata from a system under test (SUT); analyzing network information associated with one or more remote direct memory access (RDMA) transactions for determining a tuning action for adjusting a data center quantized congestion notification (DCQCN) mechanism associated with the SUT, wherein the network information includes the INT metadata and DCQCN information; and performing the tuning action for adjusting the DCQCN mechanism associated with the SUT.".

In the Claims

Column 14, Claim 1, Line 12, after "in-band" insert --network--.

Column 15, Claim 9, Line 18, after "in-band" insert --network--.

Column 16, Claim 17, Line 26, after "in-band" insert --network--.

Signed and Sealed this
Twenty-fourth Day of May, 2022

Katherine Kelly Vidal
*Director of the United States Patent and Trademark Office*